United States Patent [19]

Abele

[11] Patent Number: 4,746,130
[45] Date of Patent: May 24, 1988

[54] FLAT GASKET-TYPE SEAL FOR PLACEMENT BETWEEN MACHINE PARTS INCLUDING HYDRAULIC CONTROL PANELS

[75] Inventor: Berthold W. Abele, Walheim, Fed. Rep. of Germany

[73] Assignee: KSA Dichtsysteme GmbH & Co. KG, Vaihingen an der Enz, Fed. Rep. of Germany

[21] Appl. No.: 819,149

[22] Filed: Jan. 15, 1986

[30] Foreign Application Priority Data

Jul. 18, 1985 [DE]  Fed. Rep. of Germany ... 8520709[U]

[51] Int. Cl.⁴ .............................................. F16J 15/10
[52] U.S. Cl. ................................. 277/228; 277/235 R
[58] Field of Search ...................... 277/165, 227–229, 277/235 B, 235 R, 235 A

[56] References Cited

U.S. PATENT DOCUMENTS

| | | | |
|---|---|---|---|
| 2,681,241 | 6/1954 | Aukers | 277/235 B X |
| 2,807,511 | 9/1957 | Fleming | 277/235 A X |
| 3,355,181 | 11/1967 | Olson | 277/227 X |
| 3,396,978 | 8/1968 | Balkin et al. | 277/235 R X |
| 3,443,845 | 5/1969 | Walchle et al. | 277/227 X |
| 3,664,676 | 5/1972 | Petersen | 277/235 B X |
| 4,103,913 | 8/1978 | McDowell | 277/235 B |
| 4,138,144 | 2/1979 | Pierce | 277/235 R X |
| 4,239,243 | 12/1980 | Bainard et al. | 277/228 X |

FOREIGN PATENT DOCUMENTS 3329386 11/1984  Fed. Rep. of Germany ...... 277/227
57-192670 11/1982  Japan ................................... 277/227

Primary Examiner—Robert S. Ward
Attorney, Agent, or Firm—Becker & Becker, Inc.

[57] ABSTRACT

A flat gasket-type seal for placement between machine parts, especially hydraulic control panels. The seal has a metal plate against which the parts that are to be sealed are pressed. At least one elastomeric sealing ring is provided, each of which is mounted in a hole of the metal plate. To achieve a one-piece component, and for precise positioning of the sealing ring, the outer periphery of the sealing ring is secured to the peripheral surface of a hole of the metal plate via a vulcanization bond.

3 Claims, 2 Drawing Sheets 4,746,130

FLAT GASKET-TYPE SEAL FOR PLACEMENT BETWEEN MACHINE PARTS INCLUDING HYDRAULIC CONTROL PANELS

BACKGROUND OF THE INVENTION

1. Field of the Invention

The present invention relates to a flat gasket-type seal for placement between machine parts, especially hydraulic control panels, to seal them relative to one another.

2. Description of the Prior Art

To seal hydraulic control blocks and similar machine parts relative to one another, it is known to introduce annular grooves in the metal surfaces that are to be sealed, and to insert O-rings into these grooves. This requires a very high surface finish in the annular grooves, and the O-rings must be positioned very precisely in the grooves. This takes a lot of time, and moreover involves a number of shortcomings, since the O-rings can, for example, slide around, or may not fit precisely in the annular grooves if the tolerances are too great. In addition, when servicing or repairs are undertaken, there exists the danger that different O-rings get mixed up, so that the wrong O-ring is installed. There is also the danger that the O-rings can move about in the annular grooves, so that during fluctuations in pressure or pressure peaks, the O-rings can be pressed into the gap between the two metallic surfaces and can be destroyed. This can occur, in particular, when the pressure in the hydraulic unit is rapidly reduced to zero from a pressure peak.

It is also known to provide a metal plate with holes in which appropriate O-rings are loosely inserted. The drawback to this is that the user must purchase, control, and assemble various parts namely the metal plate and the different O-rings, so that here also a not inconsiderable assembly effort must be carried out. At the same time, there exists a danger that the sealing rings can be mistakenly interchanged, resulting in unsatisfactory assembly of the unit. Since the O-rings are inserted loosely into the holes of the metal plate, a sudden drop in pressure in the hydraulic unit can draw the O-rings into the hydraulic system due to the partial vacuum that occurs. A further danger is that the medium is forced between the O-rings and the metal plate, for example during a brief leak or lack of sealing. Then, when the pressure increases, this thin oil film between the O-rings and the metal plate exerts a certain pump action, which can lead to further leakage. Furthermore, with such a loose arrangement in the metal plate, the O-rings are subjected to a certain amount of fluctuation of the periphery, so that it is not possible to assure a uniformly precise positioning.

An object of the present invention is to provide a flat gasket-type seal that avoids the aforementioned drawbacks, and that, with simple means, yields a flat, rubber-metal, gasket-type seal that is embodied as a one-piece, compact component.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

The flat gasket-type seal of the present invention comprises: a metal plate having parallel side surfaces against which the parts that are to be sealed are pressed; the metal plate has at least one hole, each of which has a peripheral surface; and at least one elastomeric sealing ring, each of which is mounted in a respective one of the holes of the metal plate; each sealing ring has an outer periphery that rests against the perpheral surface of its hole, with the outer periphery of a given sealing ring, in the region between the two parallel side surfaces of the metal plate, being secured to the associated peripheral surface of a given hole via a vulcanization bond.

Further advantageous features of the present invention will be described subsequently.

DESCRIPTION OF PREFERRED EMBODIMENTS

Figure 1:
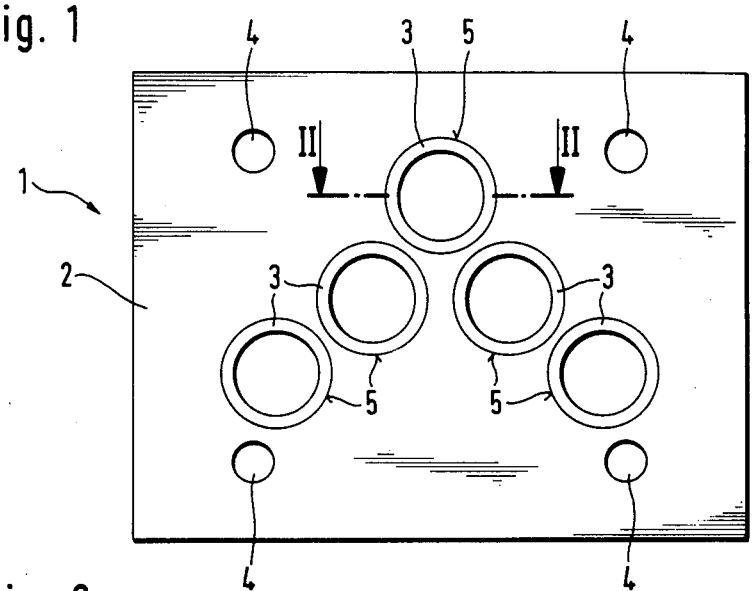
FIG. 1 is a plan view of one inventive embodiment of a flat gasket-type seal.
Figure 3:
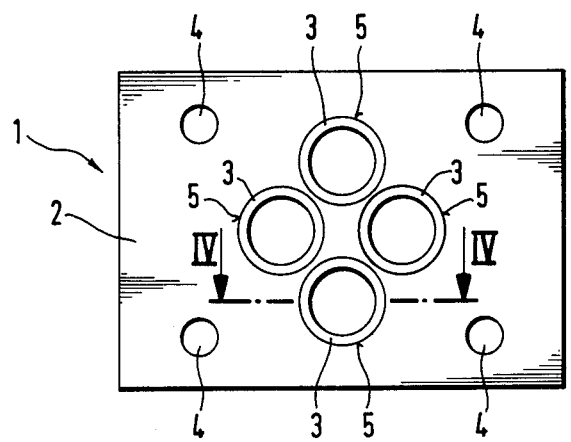
FIG. 3 is a plan view of another inventive embodiment of a flat gasket-type seal.
Figure 5:
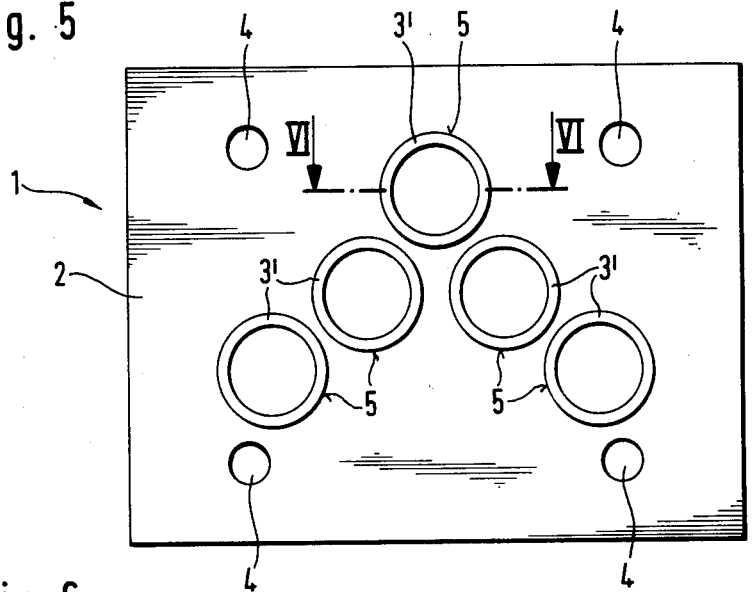
FIG. 5 is a plan view of a further inventive embodiment of a flat gasket-type seal.
Figure 7:
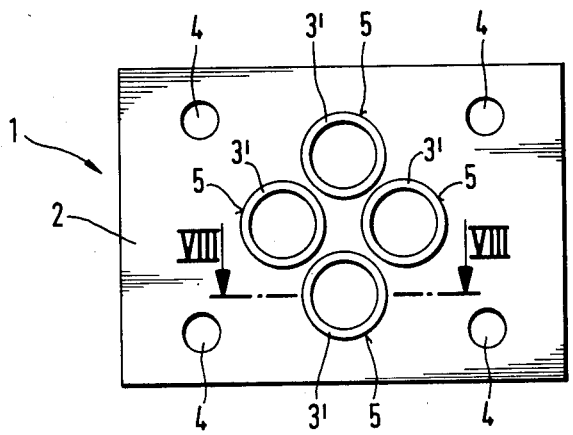
FIG. 7 is a plan view of yet another inventive embodiment of a flat gasket-type seal.

Referring now to the drawings in detail, the illustrated inventive flat gasket-type seals 1 include a metal plate 2 and a number of sealing rings 3, 3'. In the embodiments of FIGS. 1 and 5, in each case five sealing rings 3, 3' are provided that are grouped together approximately in the shape of a pointed roof. In the embodiments of FIGS. 3 and 7, in each case four sealing rings 3, 3' are provided that are grouped together approximately in the shape of a square or diamond.

The sealing rings 3, 3' of all of the embodiments are embodied as round rings that can be made of elastomeric material, preferably nitrile rubber (NBR) or a fluoroelastomer (FPM). The hardness of the elastomeric material can be approximately 40 to 90 Shore A.

As can be seen in FIGS. 1, 3, 5, and 7, the four corner regions of the metal plates 2 are provided with through-bores 4 that are disposed beyond the region of the respective group of sealing rings. During assembly of, for example, hydraulic control panels, which can be advantageously sealed using the flat gasket-type seal 1, guide bolts, screw bolts, etc. can be inserted through the bores 4. The metal plate 2 is preferably made of stainless steel. However, the metal plate 2 can also be made of another steel, and can be galvanically electroplated to prevent corrosion. The metal plate 2 is provided with round holes 5, the number of which correspond to the number of sealing rings 3, 3'; the latter are then disposed in the holes 5.

The sealing rings 3, 3' are fixedly and immovably connected with the metal plate 2, so that each flat gasket-type seal 1 represents a one-piece, compact component that has no loose parts. To accomplish this, the sealing rings 3, 3' are inventively connected with the metal plate 2 via a vulcanization bond 6. This bond 6 is disposed between the peripheral surface 7 of the hole 5 and the outer periphery 8 of the sealing ring 3. In order to achieve a fully satisfactory and long-lasting vulcanization bond 6, it can be expedient to mechanically roughen the outer periphery 8 of the sealing ring 3, 3' and/or the peripheral surface 7 of the hole 5. For an optimum vulcanization bond 6, it can also be expedient to chemically dissolve the outer periphery 8 of the sealing ring 3, 3' in order to achieve an even better bond.

In order to be able to achieve a good sealing effect at the surfaces of the machine parts, between which the flat gasket-type seal 1 is provided, opposite sides of the sealing ring 3, 3' can be provided with respective sealing portions 9 that extend beyond the remainder of the sealing ring, so that they also extend beyond the vulcanization bond 6 and the parallel side surfaces 10 of the metal plate 2. For an optimum sealing effect, the cross-sectional width of the sealing ring 3, 3' in the plane of the metal plate 2, can moreover correspond approximately to the thickness of the metal plate.

Figure 2:
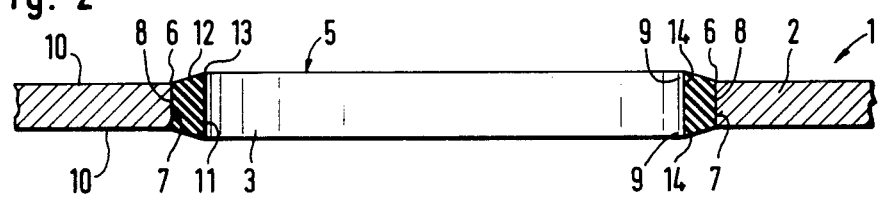
FIG. 2 is an enlarged partial sectional view taken along the line II—II in FIG. 1.
Figure 4:
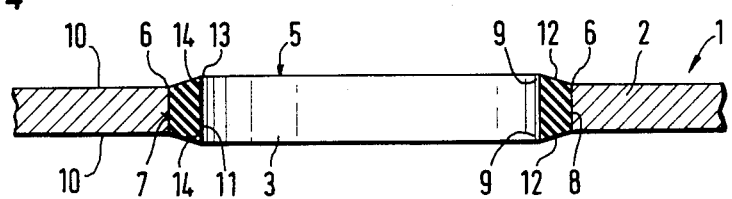
FIG. 4 is an enlarged partial sectional view taken along the line IV—IV in FIG. 3.

As can be seen in the embodiments illustrated in FIGS. 2 and 4, when viewed in the direction transverse to the plane of the metal plate 2, the inner surface 11 of the sealing ring 3 is greater than the outer periphery 8. Moreover, the sealing ring 3 is provided with inclined surfaces 12 that extend from the vulcanization bond 6, i.e. from the outer periphery 8, to the edge 13 of the inner surface 11, so that at this location the sealing portions 9 are embodied as approximately triangular sealing lips 14.

Figure 6:
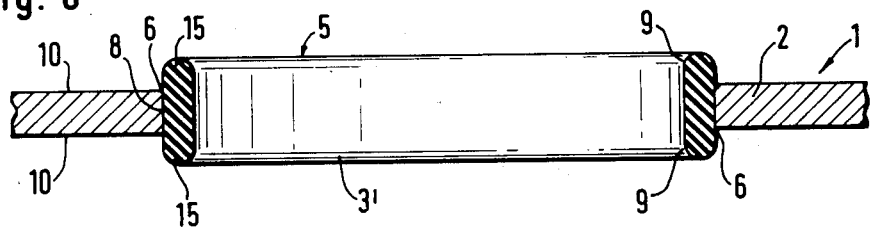
FIG. 6 is an enlarged partial sectional view taken along the line VI—VI in FIG. 5.
Figure 8:
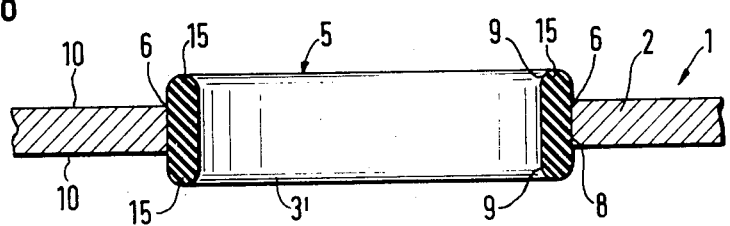
FIG. 8 is an enlarged partial sectional view taken along the line VIII—VIII in FIG. 7.

As can be seen in FIGS. 6 and 8, the sealing rings 3' illustrated in these embodiments have an approximately oval cross-sectional area. With this embodiment, the sealing portions 9 on opposite sides of the sealing ring 3' are embodied as sealing beads 15 having an approximately semicircular cross-sectional area.

As previously mentioned, the flat gasket-type seals 1 of the previously described embodiments have four or five sealing rings 3 or 3'. However, it is also within the scope of the present invention to provide, for example, only two or three sealing rings 3, 3', or as many as 20 or 25 sealing rings 3, 3' that are fixedly vulcanized to the metal plate 2.

By means of the sealing rings 3, 3' vulcanized onto the metal plate 2, it is possible to achieve a very precisely defined sealing lip or sealing bead geometry that enables the inventive, integral flat, rubber-metal gasket-type seal 1 to be positioned very exactly. It is thus possible to eliminate the introduction of annular grooves and the insertion of loose O-rings. The flat gasket-type seal 1 is purchased, controlled, stored, and used as a one-piece component. There are no longer any problems during servicing since the flat gasket-type seal 1 can be delivered by the manufacturer as a complete item. This furthermore completely precludes the danger of mistakenly interchanging sealing rings. By appropriately selecting the material for the metal plate 2 and the sealing rings 3, 3', it is also possible to design the flat gasket-type seal 1 for special applications, such as for military use, difficult to ignite liquids, phosphate esters, etc.

A further advantage of the inventive flat gasket-type seal 1 is that it can be used where up to now individual O-rings were inserted in appropriate annular grooves. Particularly suitable for such applications are the flat gasket-type seals 1 of the embodiments of FIGS. 5 to 8, where the sealing rings 3' have the protruding sealing beads 15. The flat gasket-type seal 1 illustrated in FIGS. 1 to 4 is particularly suitable for those applications where up to now the metal plates had loosely inserted sealing rings.

With the flat gasket-type seal 1 of the present invention, pressure peaks of the medium can be absorbed. The vulcanization bond 6 in particular assures that when the pressure drops, the sealing ring 3, 3' cannot be pulled into the hydraulic system. Since the sealing lips 14 or the sealing beads 15 of the inventive flat gasket-type seal 1 always reset or again assume their position due to the specifically embodied sealing portion geometry, and hence absence of overstressing, there is assured that the flat gasket-type seal 1 can be re-used approximately five times and more, since the machine parts abut the side surfaces 10 of the metal plate 2, so that the sealing ring 3, 3' cannot be destroyed. In order to be able to automatically feed and assemble the compact and complete gasket-type seal 1, for example under mass production conditions, it can be expedient to provide a locating bore on the metal plate 2. Due to its one-piece construction, the inventive flat gasket-type seal 1 can be installed overhead as well as blind, since the sealing rings 3, 3' are vulcanized onto the plate 2 and cannot fall out. The seal 1 is visible from the outside. This means that after the seal is supposed to have been installed, it is possible via a simple visual inspection to determine whether the seal 1 has in fact been installed. A considerable savings in cost is achieved during assembly utilizing the inventive flat gasket-type seal 1, because in contrast to the previously known, multi-part sealing elements, it is necessary to only handle the integral, one-piece seal 1. When the hydraulic system "breathes" to a certain extent, the inventive flat gasket-type seal 1, i.e. the sealing rings 3, 3', remain precisely positioned in their intended location. This is not the case with a loosely inserted O-ring, because the latter can move in its groove and can even be pressed out.

The present invention is, of course, in no way restricted to the specific disclosure of the specification and drawings, but also encompasses any modifications within the scope of the appended claims.

What I claim is:

1. A flat gasket-type seal for placement between machine parts to seal the latter relative to one another in hydraulic technique, especially hydraulic control panels, to seal them relative to one another; said seal comprises:

a metal plate having parallel side surfaces against which said parts that are to be sealed are pressed; said metal plate has at least one hole, each of which has a peripheral surface; and at least one elastomeric sealing ring, each of which is disposed in a respective one of said holes of said metal plate; each of said sealing rings has an outer periphery that rests against said peripheral surface of the associated hole, with the outer periphery of a given sealing ring, in the region between said two parallel side surfaces of said metal plate, being secured to the associated peripheral surface of a given hole via a vulcanization bond, said outer periphery of a given one of said sealing rings being mechanically roughened and/or chemically dissolved to promote said vulcanization bond; each of said sealing rings being provided with two sealing portions, each of which extends beyond said vulcanization bond on a respective one of said parallel side surfaces of said metal plate and each of which extends beyond the plane of a given one of said parallel side surfaces of said metal plate; the cross-sectional width of said sealing ring in the plane of said metal plate corresponding approximately to the thickness of said metal plate; each of said sealing rings being provided with an inner peripheral surface, the length of which, as measured transverse to the planes of said parallel side surfaces of said metal plate, is greater than the length of said outer periphery of said sealing ring; said inner peripheral surface of a given one of said sealing rings having two oppositely disposed edges, with a respective inclined surface extending inwardly from a given one of said edges to said outer periphery and vulcanization bond; each of said inclined surfaces delimits an approximately triangular one of said sealing portions of said sealing ring; said metal plate being provided with two to twenty of said holes, each of which has secured to its peripheral surface, via one of said vulcanization bonds, a given one of said sealing rings, said metal plate being provided with three to six of said holes; said metal plate being provided with through-bores disposed outwardly of the vicinity of a group of said holes in which are vulcanized securing rings, said through-bores being disposed in corner regions of said metal plate.

2. A flat seal according to claim 1, in which said sealing ring is made of a material selected from the group consisting of nitrile rubber and a fluoroelastomer.

3. A flat seal according to claim 1, in which said metal plate has a galvanically electroplated surface.

* * * * *